United States Patent [19]

Burns et al.

[11] Patent Number: 5,291,266

[45] Date of Patent: Mar. 1, 1994

[54] DEPOLARIZED LIGHT SOURCE FOR FIBER OPTIC SENSORS

[75] Inventors: William K. Burns, Alexandria, Va.; Robert P. Moeller, Ft. Washington; Marta M. Howerton, Bowie, both of Md.

[73] Assignee: The United States of America as represented by the Secretary of the Navy, Washington, D.C.

[21] Appl. No.: 806,384

[22] Filed: Dec. 13, 1991

[51] Int. Cl.[5] .......................... G01B 9/02; G02B 5/30
[52] U.S. Cl. .................................... 356/345; 356/351
[58] Field of Search ............................... 356/345, 351

[56] References Cited

U.S. PATENT DOCUMENTS

| | | | |
|---|---|---|---|
| 4,266,850 | 5/1981 | Burns | 385/8 |
| 4,529,312 | 7/1985 | Pavlath et al. | 356/350 |
| 4,897,543 | 1/1990 | Kersey | 250/227 |
| 4,932,783 | 6/1990 | Kersey et al. | 356/345 |
| 5,104,222 | 4/1992 | Kersey et al. | 356/345 |

OTHER PUBLICATIONS

Application, S/N 07/584,221, Filed Sep. 18, 1990, Inventors: A. D. Kersey et al., "System and Method for Minimizing Input Polarization-Induced Phase Noise in an Interferometric Fiber-Optic Sensor Using Depolarized Input Light".
Publication, "New Polarization-Insensitive Detection Technique for Coherent Optical Fibre Heterodyne Communications" Electronics Letters, vol. 23, No. 18, Aug. 27, 1987, pp. 924–926.
Publication, "Dependence of Visibility on Input Polarization in Interferometric Fiber-Optic Sensors", by A. D. Kersey et al., Optics Letters, vol. 13, Apr. 1988, pp. 288–290.
Publication, "Observation of Input-Polarization-Induced Phase Noise in Interferometric Fiber-Optic Sensor", by A. D. Kersey et al., Optics Letters, vol. 13, No. 10, Oct. 1988, pp. 847–849.
Publication, "Demonstration of Lead Sensitivity of a Fiber Interferometer Due to Magneto-Optically Induced Input Polarization Fluctuation", by A. D. Kersey et al., Optical Fiber Sensors, Springer Proceedings in Physics, vol. 44, 1989 pp. 166–171.
Publication, "Monomode Fibre Polarisation Scrambler", by A. D. Kersey et al., Electronics Letters, vol. 23, No. 12, Jun. 4, 1987, pp. 634–636.
Publication, "Analysis of Input-Polarization-Induced Phase Noise in Interferometric Fiber-Optic Sensors and Its Reduction Using Polarization Scrambling", by A. D. Kersey et al., Journal of Lightwave Technology, vol. 8, No. 6. Jun. 1990, pp. 838–845.

*Primary Examiner*—Vincent P. McGraw
*Attorney, Agent, or Firm*—Thomas E. McDonnell; George Jameson

[57] ABSTRACT

An apparatus comprised of a depolarized light source for fiber optic sensors is disclosed. In a preferred embodiment, the depolarized light source of the apparatus comprises: a first laser for generating a first beam at a first frequency, the first beam having a linear polarization state; a second laser for generating a second beam at a second frequency, the second beam having a linear polarization state; a means for rotating the polarization state of the second beam so that the first and second beams have orthogonal linear polarization states with respect to each other; and a means for combining the first beam with the polarization-rotated second beam to obtain a composite beam which is depolarized. In a system operation, the apparatus comprises: a source of depolarized light; an integrated optic modulator means for receiving a modulator drive signal; a first low-birefringence fiber for conveying the depolarized light beam from the depolarized light source to the integrated optic modulator means, the integrated optic modulator means modulating only one linear polarization state in the depolarized light beam as a function of the modulator drive signal to produce a modulated beam; a photodetector; and a second low-birefringence fiber for conveying the modulated light beam to the photodetector, the photodetector being responsive to the modulated light beam for developing an electrical signal proportional to the modulator drive signal.

20 Claims, 4 Drawing Sheets

DETECTOR OUTPUT WITH DEPOLARIZED LIGHT SOURCE

DETECTOR OUTPUT WITH ONE LASER BLOCKED

DEPOLARIZED LIGHT SOURCE FOR FIBER OPTIC SENSORS

BACKGROUND OF THE INVENTION

1. Field of the Invention

The present invention relates to fiber optic sensors and particularly to a depolarized light source for providing a constant optical polarization state of depolarized light to a remotely-located fiber optic sensor.

2. Description of the Prior Art

Due to birefringence in optical fibers there is always a problem in delivering light through a long fiber run to a remote location with a definite polarization state. Input polarization states tend to be altered to different states at the output of the fiber. In general, three different approaches have been employed to solve or circumvent this problem. In a first approach, polarization can be maintained by using a high-birefringence polarization-preserving fiber. In a second approach, polarization can be actively controlled with a birefringence device which produces the desired state at the output in conjunction with a feedback loop. In a third approach, depolarized light can be used which will remain depolarized, independent of fiber birefringence.

In many fiber sensor and coherent communications applications, polarization control at the output end of a fiber is important because two optical signals are being interfered on a detector If the two beams do not have the same polarization, "fading" results. In systems with a remote integrated optic device, generally a fixed linear polarization state of constant amplitude is required at the input of the remote device. Since depolarized light can always be described as the superposition of any two orthogonal, uncorrelated polarization states, the use of depolarized light in such systems will always provide the required polarization state with a penalty of 3 dB optical power loss. The difficulty is that, except for broadband sources which can easily be depolarized using lengths of high birefringence fiber, depolarized light sources do not generally exist.

OBJECTS OF THE INVENTION

Accordingly, it is an object of this invention to provide an improved depolarized light source.

Another object of this invention is to provide a depolarized light source so that a constant optical polarization state can be delivered t o a remote location over a low-birefringence optical fiber.

Another object of this invention is provide an exemplary depolarized light source which utilizes two narrowband lasers to produce two beams of linearly polarized light, rotates the output polarization state of one beam by 90 degrees and then combines the polarization-rotated beam with the other beam to obtain a depolarized composite beam.

Another object of this invention is to provide a depolarized light source for transmitting depolarized light over low-birefringence, single-mode, optical fiber to a remotely-located, integrated optic modulator for modulation by a modulator signal.

Another object of this invention is to provide a system which generates and transmits a composite beam containing first and second orthogonal linear polarization states of depolarized light into a low-birefringence fiber, passes the depolarized light through the fiber, then through a fiber polarizer to remove one linear polarization state, and then applies the remaining linear polarization state of light to an integrated optic modulator to modulate the constant amplitude linearily polarized light by means of a modulator drive signal.

Another object of this invention is to provide a system for delivering depolarized light over a low-birefringence fiber to a remote location with a definite polarization state.

A further object of this invention is to provide a system which generates and launches a composite beam containing first and second orthogonal linear polarization states of depolarized light into a low-birefringence fiber to a self-polarizing integrated optic modulator to modulate the depolarized light by means of a modulator drive signal to produce a modulated beam, and then transmits the modulated beam through a second low-birefringence fiber to an optical detector to produce an output signal.

SUMMARY OF THE INVENTION

These and other objects of the invention are achieved by providing a depolarized light source which can transmit a constant optical polarization state of depolarized light to a remote location over a low-birefringence optical fiber. In a system application, an integrated optic modulator means is located at the remote location for modulating only one linear polarization state in the depolarized light as a function of a modulation signal to produce a modulated beam. The modulated light beam is then transmitted over a second low-birefringence optical fiber to an optical detector to produce an electrical output signal proportional to the modulation signal.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION

Figure 1:
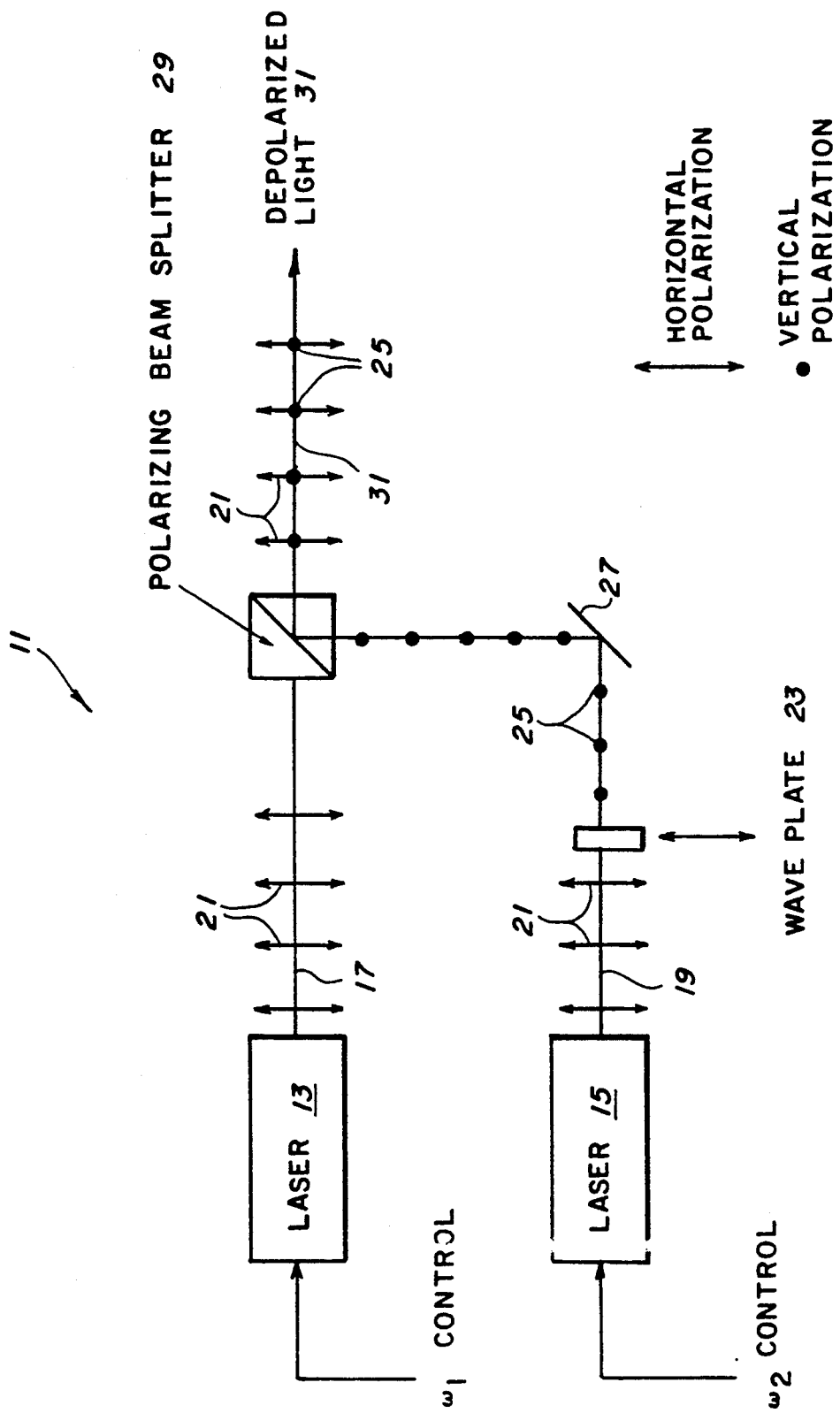
FIG. 1 illustrates a preferred depolarized light source.

Referring now to FIG. 1, there is shown a depolarized source 11 which includes two exemplary, diode-pumped (not shown), Nd:YAG lasers 13 and 15 which emit CW (continuous wave) light at 1.06 microns or 1.3 microns. These Nd:YAG lasers 13 and 15 are very narrowband (about 1 kHz) lasers which can be precisely wavelength tuned either thermally or with piezoelectric controllers (not shown). The Nd:YAG lasers 13 and 15 are normally linearly polarized. As shown in FIG. 1, the light beams 17 and 19 from the respective lasers 13 and 15 have linear horizontal polarization states, as represented by the vertical lines 21

The output linear horizontal polarization state of the beam 19 from laser 15 is rotated 90 degrees by a waveplate 23 which is disposed in the optical path of the beam 19 from laser 15. The waveplate 23 changes the polarization state of the beam 19 from a linear horizontal polarization state to a linear vertical polarization state, which is represented by dots 25.

The beam 19, which now has a linear vertical polarization state, propagates from the waveplate 23 to a mirror 27 which reflects it to a polarizing beam splitter 29. Polarizing beam splitter 29 combines the linear vertically polarized beam 19 from the mirror 27 with the linear horizontally polarized beam 17 from laser 13 to develop a composite beam 31. This combination of the beams 17 and 19 into the composite beam 31 puts the two linear polarization states of the beams 17 and 19 at 90 degrees with respect to each other in the combined beam 31 and, since they are from different uncorrelated sources and have the same amplitude, then the composite beam is depolarized.

To be more precise the exact frequencies of the lasers 13 and 15 must be considered. Let the frequency of the laser 13 be $\omega_1$ and the frequency of the laser 15 be $\omega_2$. As indicated in FIG. 1, the frequency of the laser 13 is controlled by an $\omega_1$ control voltage, while the frequency of the laser 15 is controlled by an $\omega$control voltage. For $\omega 1 = \omega_2$, the phase of each of the lasers 13 and 15 will change randomly on a time scale equal to the laser coherence time ($t_c \sim 1$/bandwidth) or $\sim 1$ msec (millisecond). For averaging times of a subsequent detector (to be explained) that are long compared to $t_c$, the composite beam 31 will appear depolarized. For averaging times of a subsequent detector (to be explained) that are short compared to $t_c$, instantaneous polarization states will be observed. For $\omega_1 \neq \omega_2$, the phase between the superimposed linear states will be $(\omega_1 - \omega_2)t = \Delta\omega t$ and the instantaneous polarization state will change at frequency $\Delta\omega$, making the composite beam 31 appear depolarized for averaging times greater than $2\pi/\Delta\omega$. In this discussion, $\Delta\omega$ is equal to the difference between the frequencies $\omega_1$ and $\omega_2$ of the lasers 13 and 15. Since $\Delta\omega$ can be adjusted to 1-100 GHz (gigahertz), the composite beam 31 will appear depolarized for averaging (detector) times longer than $(1 \text{ to } 0.01) \times 10^{-9}$ sec. This should be adequate for sensor or communications applications up to 10-20 GHz. In practice, $\Delta\omega$ would be adjusted as large as necessary so that the beat note at $\Delta\omega$ and any mixing terms between the beat note and any signal of interest would be far from (much greater than) the frequency range of interest. The "beat note" arises from the mixing of the two optical beams at the detector (to be explained) with frequency difference $\Delta\omega$.

It should be noted at this time that a CW, diode-pumped, Nd:YAG laser typically uses a current which can be varied to drive its pump diode. Varying this current varies the output power of the Nd:YAG laser. For this invention, the adjustments (not shown) of both of the lasers 13 and 15 are varied to equalize the powers of the two orthogonal linearly polarized beams in the combined beam 31 that is launched from the source 11 into the low-birefringence fiber (43 in FIGS. 5 and 6).

Figure 2:
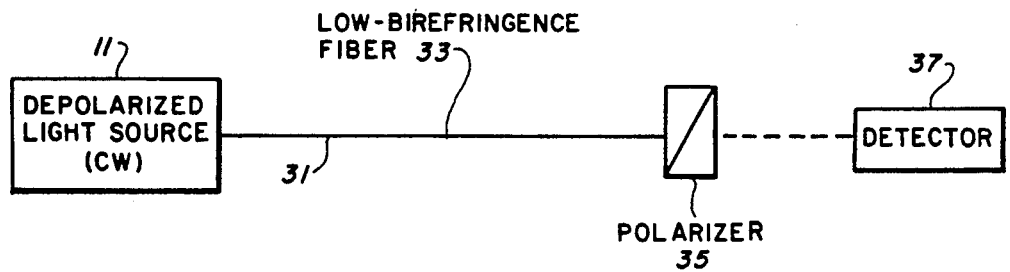
FIG. 2 is a simplified schematic diagram which basically demonstrates the ability of the depolarized light source of FIG. 1 to deliver a constant polarization state of depolarized light down a long length of ordinary low-birefringence fiber to a detector.

FIG. 2 illustrates an experimental arrangement which demonstrates the ability of the depolarized light source 11 of FIG. 1 to deliver a constant polarization state of depolarized light down a long length of ordinary low-birefringence fiber to a detector. The depolarized composite beam 31 from the depolarized light source 11 is transmitted into an exemplary 180 m (meter) long single mode low-birefringence fiber 33 and then through a polarizer 35 to a photodetector or detector 37.

It will be recalled that the depolarized composite beam 31 is comprised of two orthogonal linear polarization states. In order to deliver only one constant polarization state to the detector 37, the polarizer 35 is utilized to pass only one linear polarization state in the depolarized composite beam 31 to the detector 37.

Figure 3:
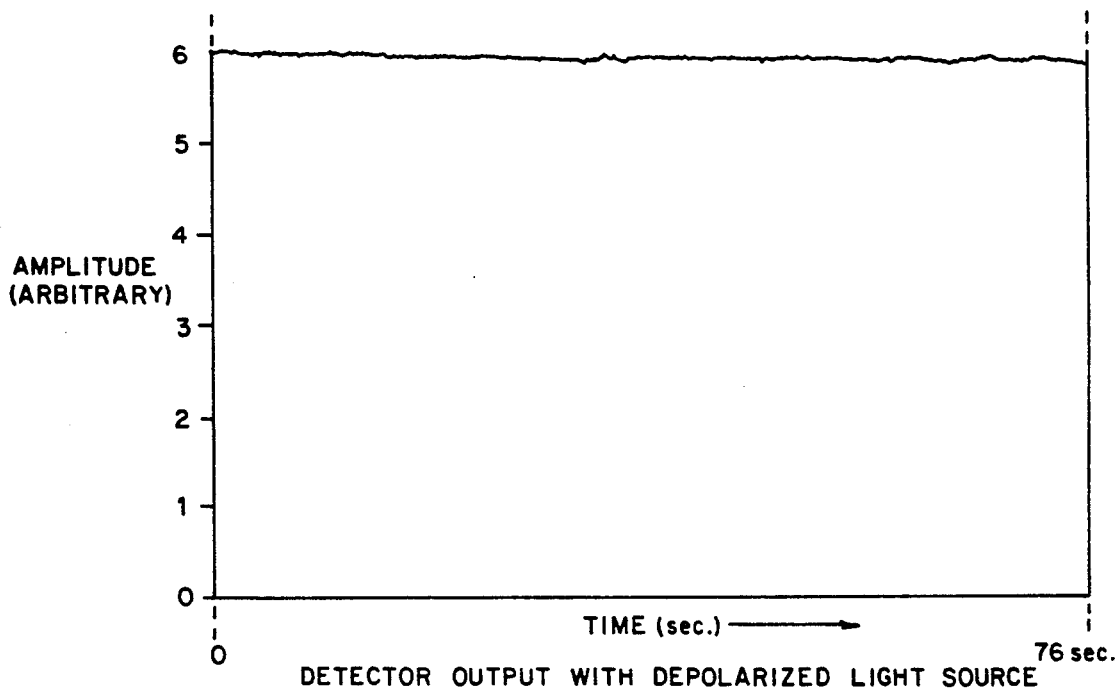
FIG. 3 is a waveform which illustrates the output of the detector in FIG. 2 when the depolarized light source of FIG. 1 is being utilized.

FIG. 3 shows the output of the detector 37 in FIG. 2 with the depolarized light source 11 in operation over a time period of 76 sec. (seconds). Note that the amplitude (in arbitrary units) of the signal at the output of the detector 37 is substantially constant even though the low-birefringence fiber 33 is bent and twisted to vary the birefringence of the fiber 33 over that 76 second period.

Figure 4:
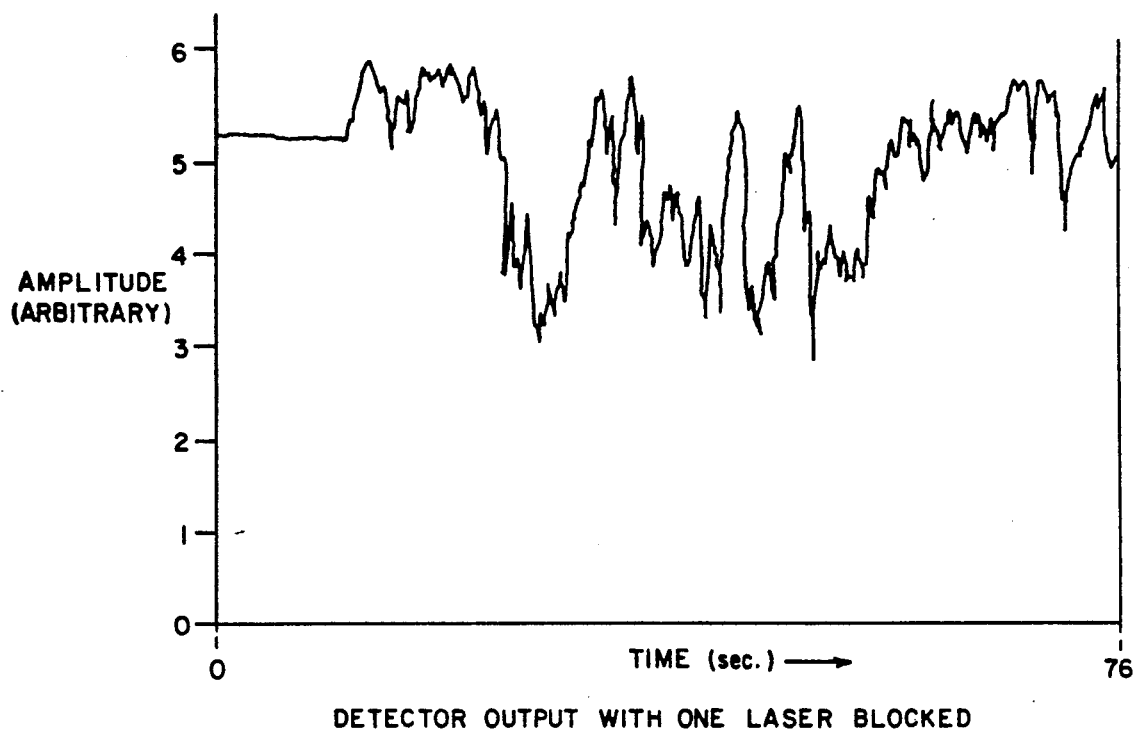
FIG. 4 is a waveform which illustrates the output of the detector in FIG. 2 when one of the lasers in the depolarized light source of FIG. 1 is blocked or not operating.

FIG. 4 shows the output of the detector 37 in FIG. 2 with one of the beams 17 and 19 of the respective lasers 13 and 15 in the depolarized light source 11 blocked over a time period of 76 seconds, so that the light launched into the low-birefringence fiber 33 is in a single linear polarization state. Note that the amplitude (in arbitrary units) of the signal at the output of the detector 37 varies widely over the latter 60 second period as the fiber 33 is bent and twisted to vary the birefringence of the fiber 33.

Figure 5:
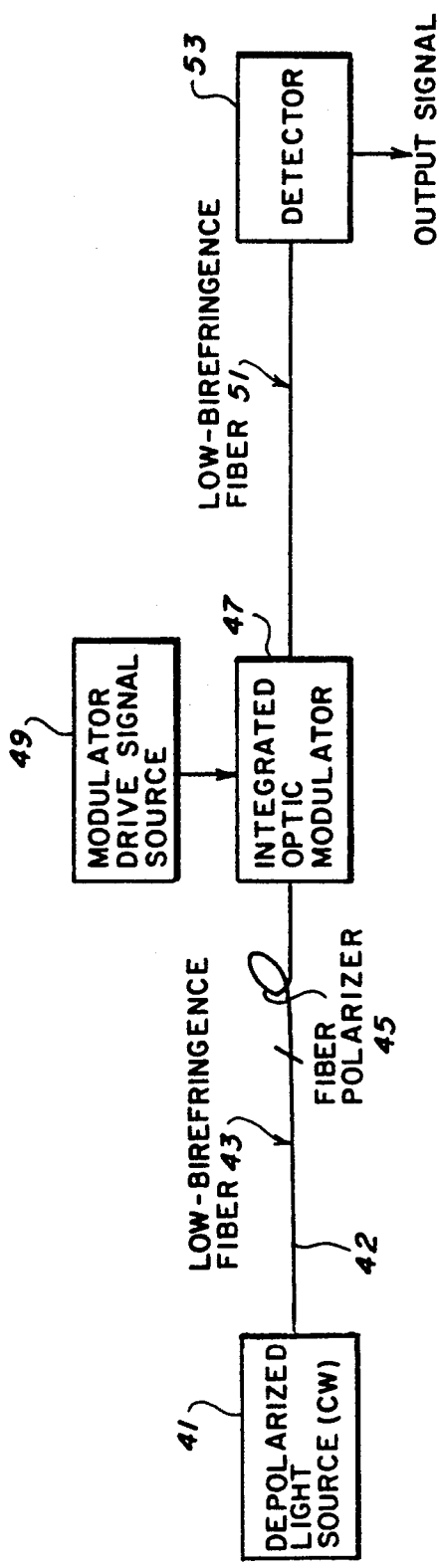
FIG. 5 is a schematic diagram showing the incorporation of a depolarized light source in a first system embodiment.
Figure 7:
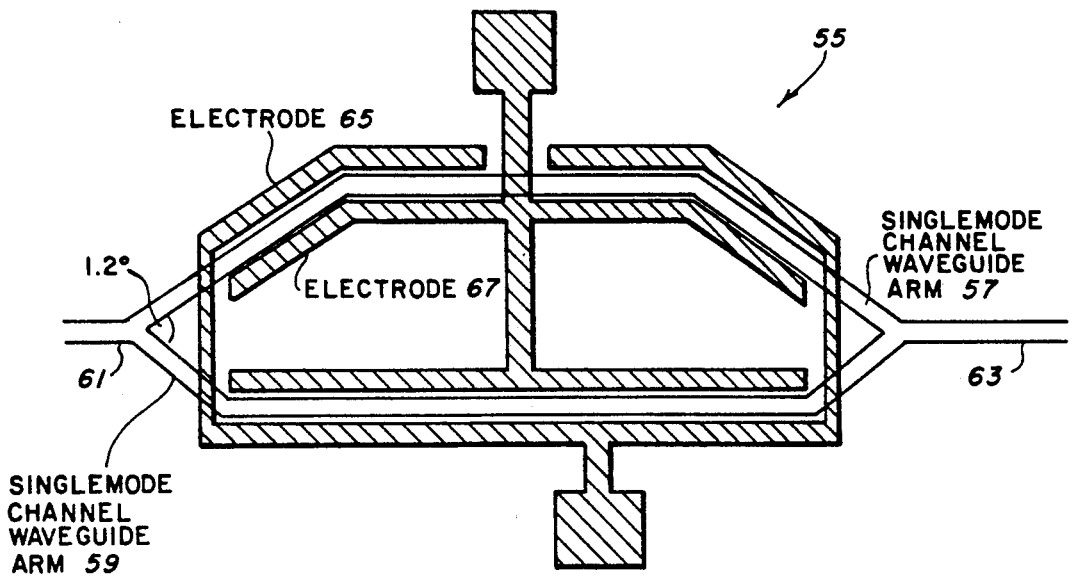
FIG. 7 is a schematic diagram of the single polarization waveguide device of FIG. 6.

FIG. 5 is a schematic diagram showing the incorporation of a depolarized light source into a practical first system embodiment. In the embodiment of FIG. 5, a depolarized light source 41 launches a CW (continuous wave) depolarized composite light beam 42, similar to the depolarized composite light beam 31 of FIGS. 1 and 2, into a length of low-birefringence fiber 43 and then through a fiber polarizer 45 to a remotely-located integrated optic modulator 47. An example of the configuration of the integrated optic modulator 47 is shown in the configuration of FIG. 7 (to be explained). The distal end of the fiber 43 is directly butt-coupled to the input end of the fiber polarizer 45, while the output end of the fiber polarizer 45 is directly butt-coupled to the integrated optic modulator 47.

In the embodiment of FIG. 5, the integrated optic modulator 47 requires an input polarized light beam which has a single linear polarization state. This single linear polarization state is provided by the fiber polarizer 45 with a 3 dB optical power loss from the depolarized beam 42 and is independent of the birefringence of the low-birefringence fiber 43. More specifically, the modulator 47 requires an input linearly polarized light beam with only an exemplary horizontal linear polarization state. The fiber polarizer 45 is implemented to only pass the horizontal linear polarization state in the depolarized composite beam 42 into the integrated optic modulator 47. It should be noted that the fact that the light delivered to the remotely located fiber polarizer 45 is depolarized means that the fiber polarizer 45 can select any linear polarization state from that light and the detected amplitude of the light will not change.

A modulator drive signal source 49 (such as an exemplary antenna) supplies a sensed modulator drive signal (such as a sensed electromagnetic or RF (radio frequency) signal to the integrated optic modulator 47 to modulate the input light beam (with the linear horizontal polarization state) as a function of the sensed modulator drive signal. The modulated output of the integrated optic modulator 47 is transmitted through another length of low-birefringence fiber 51 to an optical detector 53 which provides an output electrical signal proportional to the modulator drive signal.

For an integrated optic modulator 47 operating in the 0-1 GHz range, $\Delta\omega$ is set large enough (5-10 GHz) to avoid side bands in this range. However, it should not be set too large so that the light from the two lasers 13 and 15 (FIG. 1) appearing at the modulator 47 differs by too much in wavelength ($\lambda$). For a beat note $\Delta\omega$ of 10 GHz at the detector 53, the wavelength difference $\Delta\lambda$ between the wavelengths of the two lasers 13 and 15 is ~0.3 Å, which is still sufficiently small that the modulator 47 behaves in the same way for each wavelength. In Mach-Zehnder modulators with an intrinsic phase bias the phase bias can be defined as the optical path length difference between interferometer arms 57 and 59 shown in FIG. 7 divided by the wavelength of the light in the waveguide arms 57 and 59. The phase bias changes as a function of the wavelength. At a 1 micron wavelength, the change in phase bias for $\Delta\lambda$ of 0.3 Å is $\Delta\lambda/\lambda$ or 30 ppm (parts per million). This would result in a change of a 90 degree phase bias by only 0.003 degrees, which is negligible.

Figure 6:
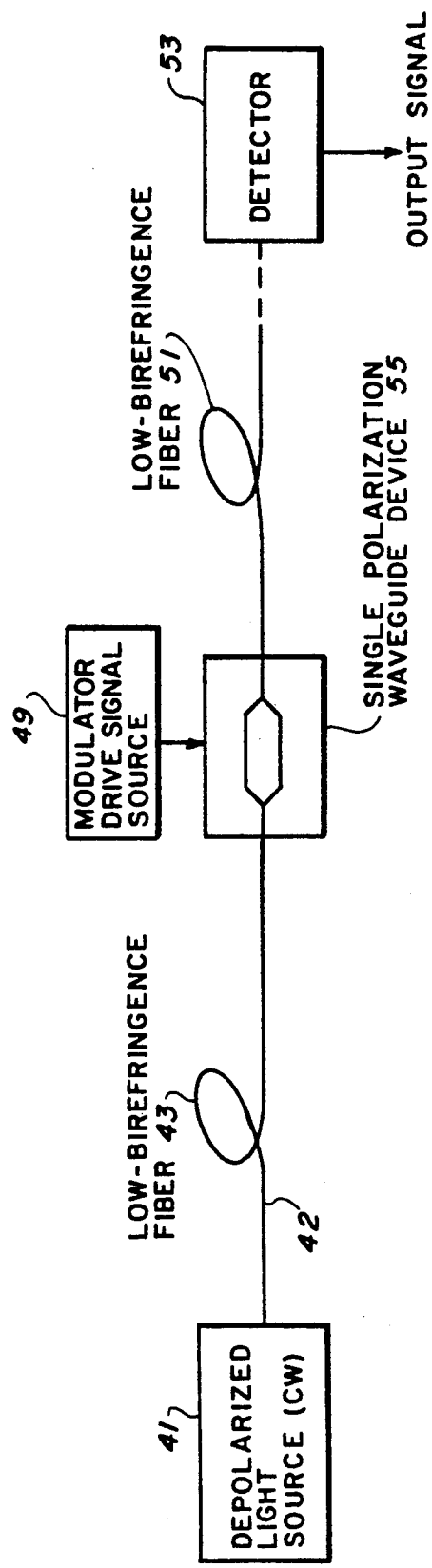
FIG. 6 is a schematic diagram showing the incorporation of a depolarized light source in a second system embodiment.

FIG. 6 is a schematic diagram showing the incorporation of the depolarized light source 41 into a practical second system embodiment. The embodiment of FIG. 6 differs from the embodiment of FIG. 5 in that a single polarization waveguide device or integrated optic modulator 55 is utilized in FIG. 6 to replace the fiber polarizer 45 and integrated optic modulator 47 of FIG. 5. To understand the integrated optic modulator 55 of FIG. 6 more clearly, reference will now be made to FIG. 7, which shows the configuration of an exemplary modulator 55 in detail.

The integrated optic modulator 55 of FIG. 7 is an exemplary Mach Zehnder modulator or other optical modulator which is used as a remote electric field sensor. The modulator 55 has a first waveguide arm 57 which is physically longer than a second waveguide arm 59. Each of the waveguide arms 57 and 59 extends from an input branch 61 to an output branch 63.

The difference in physical length between the waveguide arms 57 and 59 effectively unbalances the waveguide arms 57 and 59 and provides a required bias of $\pi/2$ radians for achieving a linear response to small voltages (V) that are typically applied to electrodes 65 and 67. The process that is used to make the configuration of the integrated optic modulator 55 of FIG. 6 is described more fully in relation to FIG. 2 of U.S. Pat. No. 4,266,850, and such patent is incorporated by reference into this application to more completely describe the configuration of the integrated optic modulator 55 of FIG. 7 of the present application.

The integrated optic modulator 55 of FIGS. 6 and 7 incorporates the polarization function of the polarizer 45 of FIG. 5 into the integrated optic modulator 55 by way of the processes that are used to make the integrated optic modulator 55. More specifically, the waveguide arms 57 and 59 of the modulator 55 are made by a proton exchange process in $LiNbO_3$ or $LiTaO_3$ which provides an index increase and thus waveguiding action only for the extraordinary mode (TE mode for an x-cut crystal). Thus, the integrated optic modulator 55 made with this process is an optical polarizer itself, transmitting the desired TE mode and converting the unwanted TM mode to a substrate mode which is not guided out of output branch 63.

Referring back to FIG. 6, it should be noted that the fact that the light delivered to the remotely located modulator 55 is depolarized means that the modulator 55 can select any linear polarization state from that light and the detected amplitude of the light will not change. After the one linear polarization state in the depolarized composite beam is accepted and modulated by the modulator 55, the transmitted and EO modulated TE mode from the modulator 55 is then coupled through the ordinary low-birefringence fiber 51 to the detector 53. With no modulator drive signal being applied to the modulator 55, the system of FIG. 6 will produce a substantially constant output signal from the detector 53, even though the fiber 43 or the fiber 51 is bent and twisted to vary the birefringence.

The invention provides the following advantages:

1. The invention takes advantage of the narrow linewidth and precise wavelength tuning ability of diode pumped Nd:YAG lasers to make a depolarized source with a definite but small wavelength spread which can operate in a certain frequency range. Two semiconductor sources could also be used, but it is more difficult to match their wavelengths and their spectral purity is not as good.

2. The invention solves the problem of supplying a linear polarization state to a remote integrated optic modulator over an optical fiber without using polarization holding fiber or polarization controllers. It allows low cost optical fiber to be used and does not require feedback loops from the detector to the light source or suffer from the reset problems of polarization controllers.

3. The invention does not require an external modulator and allows operation at higher frequencies, i.e., the beat note is not restricted to a modulation frequency.

4. The invention provides a totally new implementation of a depolarized light source and should extend the use of depolarized light to many polarization sensitive fiber delivery systems.

5. In one embodiment, the fiber polarizer at the input to the integrated optic modulator can be eliminated, and ordinary single mode fiber or low-birefringence fiber can be butt-coupled to the integrated optic modulator without the need for azimuthal alignment which is required for a fiber polarizer or high-birefringence fiber.

6. High-birefringence fiber can be totally removed from the apparatus of the invention, reducing assembly complexity and costs for long fiber runs. Higher coupling efficiencies should also be obtained with ordinary fiber than with polarization holding fiber.

Therefore, what has been described is a depolarized light source which can transmit a constant optical polarization state of depolarized light to a remote location over a low-birefringence optical fiber. In a system application, an integrated optic modulator is located at the remote location for modulating a constant amplitude, linearly polarized component of the depolarized light as a function of a modulation signal. The modulated light is then transmitted over a second low-birefringence optical fiber to an optical detector to produce an electrical output signal proportional to the modulation signal.

It should therefore readily be understood that many modifications and variations of the present invention are possible within the purview of the claimed invention. For example, any two linearly polarized, wavelength tunable lasers can be used in FIG. 1, provided the tunability provides near wavelength overlap; the bulk optic components in FIG. 1 (such as the waveplate 23 and the polarizing beam splitter 29) can be replaced by fiber components; in lieu of the waveplate 23 in FIG. 1, one of the lasers 13 and 15 in FIG. 1 can be rotated 90 degrees with respect to the other laser; in the system embodiment of FIG. 6, any integrated optic modulator material system that only guides a single polarization mode (TE or TM) can be used; and in the system embodiment of FIG. 5, in place of the fiber polarizer 45 an integrated optic polarizer may be incorporated as part of the integrated optic modulator 47. It is therefore to be understood that, within the scope of the appended claims, the invention may be practiced otherwise than as specifically described.

What is claimed and desired to be secured by letters patent of the United States is:

1. An apparatus comprising a depolarized light source, said depolarized light source comprising:
   a first laser for generating a first beam at a first frequency, said first beam having a linear polarization state;
   a second laser for generating a second beam at a second frequency, different from said first frequency said second beam having a linear polarization state;
   means for rotating the polarization state of said second beam so that said first and second beams have orthogonal linear polarization states with respect to each other; and
   means for combining the first beam with the polarization-rotated second beam to obtain a composite beam which is depolarized.

2. An apparatus comprising a depolarized light source, said depolarized light source comprising:
   a first laser for generating a first beam at a first frequency, said first beam having a linear polarization state, said first laser being tunable to produce said first beam at a desired first frequency;
   a second laser for generating a second beam at a second frequency, said second beam having a linear polarization state, said second laser being tunable to produce said second beam at a desired second frequency such that the frequency difference between said desired first and second frequencies is between 1 and 100 gigahertz (GHz) and said depolarized composite beam contains components having a frequency difference of between 1 and 100 GHz;
   means for rotating the polarization state of said second beam so that said first and second beams have orthogonal linear polarization states with respect to each other; and
   means for combining the first beam with the polarization-rotated second beam to obtain a composite beam which is depolarized.

3. The apparatus of claim 2 wherein:
said rotating means is a waveplate for rotating the linear polarization state of said second beam by substantially 90 degrees; and
said combining means is a polarizing beam splitter.

4. The apparatus of claim 3 wherein:
each of said first and second lasers is a Nd:YAG laser.

5. The apparatus of claim 2 further including:
integrated optic modulator means for receiving a modulator drive signal;
a first low-birefringence fiber for conveying said depolarized composite beam from said depolarized light source to said integrated optic modulator means, said integrated optic modulator means modulating only one linear polarization state in said depolarized composite beam as a function of said modulator drive signal to produce a modulated beam;
a photodetector; and
a second low-birefringence fiber for conveying said modulated beam to said photodetector, said photodetector being responsive to said modulated beam for developing an electrical signal proportional to said modulator drive signal.

6. The apparatus of claim 5 wherein said integrated optic modulator means comprises:
an integrated optic modulator adapted to receive said modulator drive signal; and
a fiber polarizer interposed between said first low-birefringence fiber and said integrated optic modulator, said fiber polarizer passing only one linear polarization state in said depolarized composite beam to said integrated optic modulator.

7. The apparatus of claim 5 wherein:
said rotating means is a waveplate; and
said combining means is a polarizing beam splitter.

8. The apparatus of claim 7 wherein:
each of said first and second lasers is a Nd:YAG laser.

9. The apparatus of claim 5 wherein said integrated optic modulator means comprises:
a single polarization waveguide device for accepting and modulating only one linear polarization state in said depolarized composite beam as a function of said modulator drive signal.

10. An apparatus comprising:
a source of depolarized light having orthogonal linear polarization states, said source comprising
   two tunable lasers with each of said tunable lasers being tuned to a frequency different from that of the other said tunable laser and being capable of producing a beam having a linear polarization state and
   means for merging said laser beams to obtain said depolarized light having orthogonal linear polarization states;
integrated optic modulator means for receiving a modulator drive signal said integrated optic modulator means selected from the group consisting of a single polarization waveguide device and a fiber polarizer coupled to an integrated optic modulator;
a first low-birefringence fiber for conveying said depolarized light from said depolarized light source to said integrated optic modulator means, said integrated optic modulator means modulating only one linear polarization state in said depolarized light as a function of said modulator drive signal to produce a modulated beam;
a photodetector; and
a second low-birefringence fiber for conveying said modulated light to said photodetector, said photodetector being responsive to said modulated light for developing an electrical signal proportional to said modulator drive signal.

11. The apparatus of claim 10 wherein said merging means comprise:

means for rotating the polarization state of said second beam so that said first and second beams have orthogonal linear polarization states with respect to each other; and means for combining the first beam with the polarization-rotated second beam to obtain said depolarized light having orthogonal linear polarization states.

12. The apparatus of claim 11 wherein:
said rotating means is a waveplate; and
said combining means is a polarizing beam splitter.

13. The apparatus of claim 12 wherein:
each of said first and second lasers is a Nd:YAG laser.

14. The apparatus of claim 10 wherein said integrated optic modulator means comprises:
an integrated optic modulator adapted to receive said modulator drive signal; and
a fiber polarizer interposed between said first low-birefringence fiber and said integrated optic modulator, said fiber polarizer passing only one linear polarization state in said depolarized composite beam to said integrated optic modulator.

15. The apparatus of claim 11 wherein:
said rotating means is a waveplate; and
said combining means is a polarizing beam splitter.

16. The apparatus of claim 11 wherein:
each of said lasers is a Nd:YAG laser.

17. The apparatus of claim 10 wherein said integrated optic modulator means comprises:
a single polarization waveguide device for accepting and modulating only one linear polarization state in said depolarized composite beam as a function of said modulator drive signal.

18. The apparatus of claim 17 wherein said merging means comprise:
means for rotating the polarization state of said second beam so that said first and second beams have orthogonal linear polarization states with respect to each other; and
means for combining the first beam with the polarization-rotated second beam to obtain said depolarized light having orthogonal linear polarization states.

19. The apparatus of claim 18 wherein:
said rotating means is a waveplate; and
said combining means is a polarizing beam splitter.

20. The apparatus of claim 17 wherein:
each of said first and second lasers is a Nd:YAG laser.

* * * * *